(12) United States Patent
Ida et al.

(10) Patent No.: US 8,072,110 B2
(45) Date of Patent: Dec. 6, 2011

(54) MOTOR AND COMPRESSOR

(75) Inventors: Kazuo Ida, Kusatsu (JP); Yoshihiro Kataoka, Kusatsu (JP); Yasukazu Nabetani, Kusatsu (JP); Yoshiaki Yoshida, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 185 days.

(21) Appl. No.: 12/158,354

(22) PCT Filed: Dec. 11, 2006

(86) PCT No.: PCT/JP2006/324667
§ 371 (c)(1),
(2), (4) Date: Jun. 20, 2008

(87) PCT Pub. No.: WO2007/072699
PCT Pub. Date: Jun. 28, 2007

(65) Prior Publication Data
US 2009/0278416 A1    Nov. 12, 2009

(30) Foreign Application Priority Data
Dec. 21, 2005 (JP) ................................. 2005-367458

(51) Int. Cl.
*H02K 1/27* (2006.01)

(52) U.S. Cl. ................................................ 310/156.53

(58) Field of Classification Search .............. 310/156.53, 310/156.56, 216.066, 216.106, 216.112, 310/254.1; 418/63, 87, 88
See application file for complete search history.

(56) References Cited

U.S. PATENT DOCUMENTS

| | | | | |
|---|---|---|---|---|
| 4,358,697 A | * | 11/1982 | Liu et al. | 310/156.84 |
| 4,385,875 A | * | 5/1983 | Kanazawa | 418/63 |
| 4,522,038 A | * | 6/1985 | Ozu | 62/228.5 |
| 5,498,917 A | * | 3/1996 | Ninomiya et al. | 310/216.112 |
| 6,013,963 A | * | 1/2000 | Shelton, Jr. | 310/179 |
| 6,188,157 B1 | * | 2/2001 | Tajima et al. | 310/156.53 |
| 6,300,702 B1 | * | 10/2001 | Jack et al. | 310/216.066 |
| 6,340,857 B2 | * | 1/2002 | Nishiyama et al. | 310/156.53 |
| 6,359,359 B1 | * | 3/2002 | Miura et al. | 310/156.43 |
| 6,429,565 B1 | * | 8/2002 | Matsunobu et al. | 310/156.38 |
| 6,652,238 B2 | * | 11/2003 | Kajiwara et al. | 417/44.1 |
| 6,664,696 B1 | * | 12/2003 | Pham et al. | 310/216.106 |
| 6,703,743 B2 | * | 3/2004 | Kaneko et al. | 310/156.38 |
| 6,882,080 B2 | * | 4/2005 | Tanaka et al. | 310/216.112 |
| 7,109,624 B2 | * | 9/2006 | Yashiro et al. | 310/156.45 |

FOREIGN PATENT DOCUMENTS

| | | | | |
|---|---|---|---|---|
| JP | 59072957 A | * | 4/1984 | |
| JP | 61023887 A | * | 2/1986 | |
| JP | 61058995 A | * | 3/1986 | |
| JP | 03281991 A | * | 12/1991 | |
| JP | 04183988 A | * | 6/1992 | |
| JP | 09-163648 A | | 6/1997 | |
| JP | 09-298852 A | | 11/1997 | |
| JP | 2001082367 A | * | 3/2001 | |
| JP | 2001-112200 A | | 4/2001 | |
| JP | 2001-157396 A | | 6/2001 | |
| JP | 2003-032921 A | | 1/2003 | |
| JP | 2005-042632 A | | 2/2005 | |
| JP | 2005-287262 A | | 10/2005 | |

* cited by examiner

*Primary Examiner* — Tran Nguyen
(74) *Attorney, Agent, or Firm* — Global IP Counselors

(57) ABSTRACT

Two magnets in a circumferential direction of a rotor are provided in each slot of the rotor. The two magnets are consistently pulled in a direction in which they are mutually separated by magnetism of a stator and fixed on inner surfaces on both sides of the slot in the circumferential direction of the rotor.

4 Claims, 9 Drawing Sheets

MOTOR AND COMPRESSOR

CROSS-REFERENCE TO RELATED APPLICATIONS

This U.S. National stage application claims priority under 35 U.S.C. §119(a) to Japanese Patent Application No. 2005-367458, filed in Japan on Dec. 21, 2005, the entire contents of which are hereby incorporated herein by reference.

TECHNICAL FIELD

The present invention relates to a motor for use in, for example, compressors of air conditioners, refrigerators and the like, and to a compressor that employs the motor.

BACKGROUND ART

Conventionally, a motor employed in a compressor has a rotor and a stator placed radially outside the rotor. The rotor has a plurality of slots arranged side by side in the circumferential direction, and one magnet is provided in each of the slots in the circumferential direction of the rotor (refer to JP 2003-32921 A). The slot is set larger than the magnet in order to fit the magnet in the slot, and the magnet is movable in the slot in the circumferential direction of the rotor.

However, as a consequence of a trial to incorporate the conventional motor into a sealed vessel together with a compression element to constitute a compressor, there was a discovery of a problem that sounds and vibrations were generated from the motor. With regard to this, the present inventor discovered that the sounds and vibrations were generated by a lubricating oil in the sealed vessel, which entered the slot and made the magnet easily move and collide with the inner surfaces of the slot.

That is, since the one magnet is provided in each of the slots in the conventional motor, the magnet moves in the slot reciprocatingly in the circumferential direction of the rotor due to the magnetism of the stator.

In short, the magnet is consistently pulled rightward and leftward in the circumferential direction of the rotor by the magnetism of the stator, and the magnet vibrates in the circumferential direction of the rotor in the slot due to the out-of-balance of the rightward and leftward forces.

In concrete, when one slot 111 is located in a specified position with respect to the stator 120 as shown in FIG. 9A, electromagnetic attraction forces by the stator 120 are exerted on the one slot 111 (the rotor 110), and an attraction force (arrow $E_1$) exerted on the left-hand side of the one slot 111 is larger than an attraction force (arrow $F_1$) exerted on the right-hand side of the one slot 111. Therefore, an attraction force pulled leftward is exerted on the magnet 112 in the one slot 111 as indicated by arrow $G_1$, and the magnet 112 collides with the inner surface on the left-hand side of the slot 111.

When the rotor 110 rotates by a prescribed central angle, as shown in FIG. 9B, an attraction force (arrow $E_2$) exerted on the left-hand side of the one slot 111 becomes smaller than an attraction force (arrow $F_2$) exerted on the right-hand side of the one slot 111. Therefore, an attraction force pulled rightward is exerted on the magnet 112 in the one slot 111 as indicated by arrow $G_2$, and the magnet 112 collides with the inner surface on the right-hand side of the slot 111.

In FIGS. 9A and 9B, a coil wound around the teeth of the stator 120 is omitted in illustration. Moreover, a gap between the slot 111 and the magnet 112 is illustrated larger than the actual one for better comprehension.

As described above, the magnet 112 collides with the inner surfaces of the slot 111 many times when the magnet 112 vibrates in the slot 111, and sounds and vibrations are generated from the rotor 110 by the collision of the magnet 112 with the inner surfaces of the slot 111.

SUMMARY OF THE INVENTION

It is an object of the present invention to provide a motor that prevents the sounds and vibrations generated from the rotor in operation.

In order to solve the above problem, a motor of the present invention comprises:
a rotor and a stator placed radially outside the rotor, wherein
the rotor comprises a plurality of slots arranged in a circumferential direction, and
each of the slots internally receives two magnets provided in the circumferential direction of the rotor.

According to the motor of the present invention, because the two magnets are provided in the circumferential direction of the rotor in each of the slots of the rotor, the two magnets are consistently pulled in a direction in which they are mutually separated by the magnetism of the stator and fixed on inner surfaces on both sides in the rotor circumferential direction of the slot.

Therefore, since the magnets do not reciprocatingly move in the circumferential direction of the rotor in the slot in the operation of the motor, sounds and vibrations generated by the collision of the magnets with the inner surfaces of the slots can be prevented.

In accordance with one aspect of the present invention, the slots are each formed into a rectangular shape extending in a direction perpendicular to a radial direction of the rotor when viewed from a rotational axis direction of the rotor, and the magnets have a flat plate-like shape when viewed from the rotational axis direction of the rotor.

In a motor in accordance with this aspect, the slots are formed in a rectangular, shape, and the magnets have a flat plate-like shape. Therefore, the slots and the magnets can be simply formed.

In accordance with another aspect of the present invention, magnetism of the stator is exerted in a direction in which the two magnets are mutually separated in each of the slots.

In a motor in accordance with this aspect, the magnetism of the stator is exerted in the direction in which the two magnets are mutually separated in each of the slots, and therefore, the two magnets can reliably be fixed on the inner surfaces on both sides in the rotor circumferential direction of the slot.

In accordance with another aspect of the present invention, the two magnets in an identical slot have an identical polarity.

In a motor in accordance with this aspect, the two magnets in an identical slot have an identical polarity. Therefore, the magnetism exerted on the two magnets in each of the slots is not reduced, and the rotor torque is not reduced.

In accordance with another aspect of the present invention, the two magnets in an identical slot have a generally identical shape.

In a motor in accordance with this aspect, the two magnets in an identical slot have a generally identical shape, and therefore, the two magnets of a good magnetic balance can be simply formed.

In accordance with another aspect of the present invention, the two magnets in an identical slot have a generally identical structure.

In a motor in accordance with this aspect, the two magnets in an identical slot have a generally identical structure, and therefore, the two magnets of a good magnetic balance can be simply formed.

Moreover, the compressor of the present invention comprises:

a closed vessel;

a compression element placed in the closed vessel; and the motor which is placed in the closed vessel and drives the compression element via a shaft.

According to the compressor of the present invention, because the motor described above is provided, even if lubricating oil in the compressor enters the slots and the magnets are easily movable in the operation of the compressor, the magnets do not reciprocatingly move in the slots. Therefore, sounds and vibrations generated by the collision of the magnets with the inner surfaces of the slots can be prevented.

According to the motor of the present invention, two magnets are provided in the circumferential direction of the rotor in each of the slots of the rotor, and therefore, sounds and vibrations generated from the rotor can be prevented in the operation of the motor.

Moreover, according to the compressor of the present invention, because the motor described above is provided, sounds and vibrations generated from the motor can be prevented in the operation of the compressor.

DETAILED DESCRIPTION OF THE INVENTION

Figure 1:
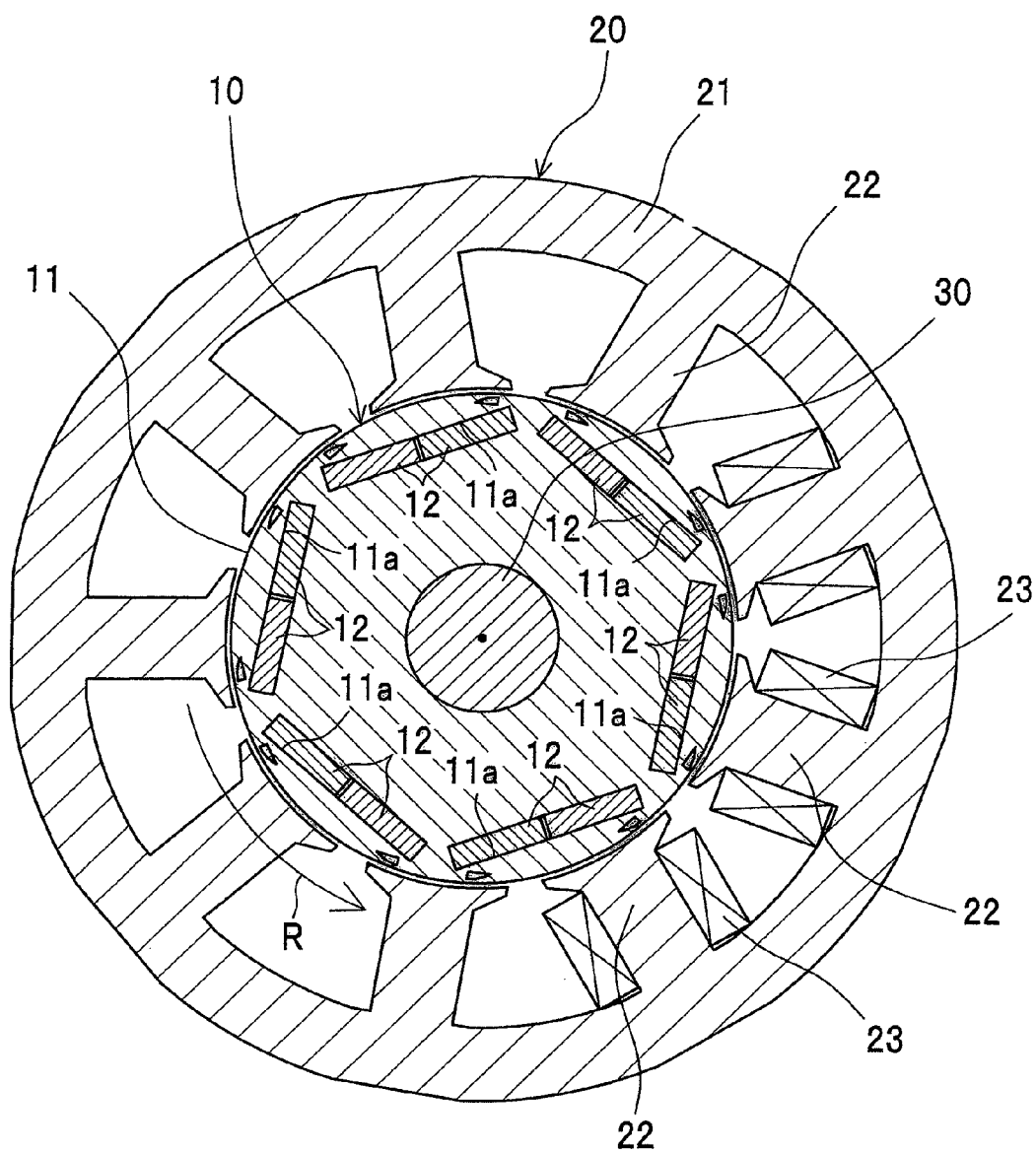
FIG. 1 is a transverse sectional view showing one embodiment of a motor of the present invention.

The present invention will now be described in detail below by the embodiments shown in the drawings.

First Embodiment

FIG. 1 shows a transverse sectional view of one embodiment of the motor of the present invention. The motor is used in, for example, the compressor of an air conditioner or a refrigerator or the like. The motor has a rotor 10 and a stator 20 placed radially outside the rotor 10 via an airgap. The rotor 10 is rotatable in the direction of arrow R.

The rotor 10 has a rotor main body 11 and magnets 12 embedded in the rotor main body 11. The rotor main body 11 has a cylindrical shape and constructed of, for example, laminated magnetic steel sheets. A shaft 30 is fitted in a hole portion located at the center of the rotor main body 11.

The rotor main body 11 has a plurality of (six in the present embodiment) slots 11a arranged in the circumferential direction. The slots 11a are formed extending generally in the circumferential direction. That is, the slots 11a are formed in a rectangular shape perpendicular to the radial direction of the rotor 10 when viewed in the rotational axis direction of the rotor 10.

In each of the slots 11a, two magnets 12 and 12 are provided arranged side by side in the circumferential direction of the rotor 10. The magnets 12 have a linear flat plate-like shape when viewed in the rotational axis direction of the rotor 10 and are constructed of, for example, permanent magnets. In order to fit the magnets 12 in the slot 11a, the slot 11a is set larger than the magnets 12, and the magnets 12 are movable in the circumferential direction of the rotor 10 in the slot 11a. That is, the two magnets 12 and 12 can mutually approach or separate in the circumferential direction of the rotor 10 in the slot 11a.

The two magnets 12 and 12 in an identical slot 11a have a generally identical shape. Moreover, the two magnets 12 and 12 in the identical slot 11a have a generally identical structure (concerning material, magnetic property, and so on). That is, the two magnets 12 and 12 in the identical slot 11a have an identical polarity. In concrete, portions of the two magnets 12 and 12, located radially outwardly of the rotor 10, have an identical polarity of one of the south pole and the north pole, and portions of the two magnets 12 and 12, located radially inwardly of the rotor 10, have an identical polarity of the other of the south pole and the north pole. It is noted that the magnets 12 have mutually opposite polarities in adjoining slots 11a, 11a.

When viewed from the rotational axis direction of the rotor 10, the stator 20 has an annular stator main body 21, a plurality of (nine in the present embodiment) teeth 22 that project radially inwardly from the inner peripheral surface of the stator main body 21, and coils 23 wound around the teeth 22. It is noted that the coils 23 are partially omitted in illustration in FIG. 1.

The plurality of teeth 22 are arranged at equal intervals in the circumferential direction of the stator main body 21. The stator main body 21 and the teeth 22 are made of, for example, iron. The coils 23 are so-called concentrated windings wound around each of the teeth 22. The coils 23 may be so-called distributed windings wound around the plurality of teeth 22.

The operation of the motor of the above construction is described next.

The rotor 10 is rotated in the direction of arrow R together with the shaft 30 by electromagnetic forces generated in the stator 20 by flowing a current through the coils 23.

Figure 2A:
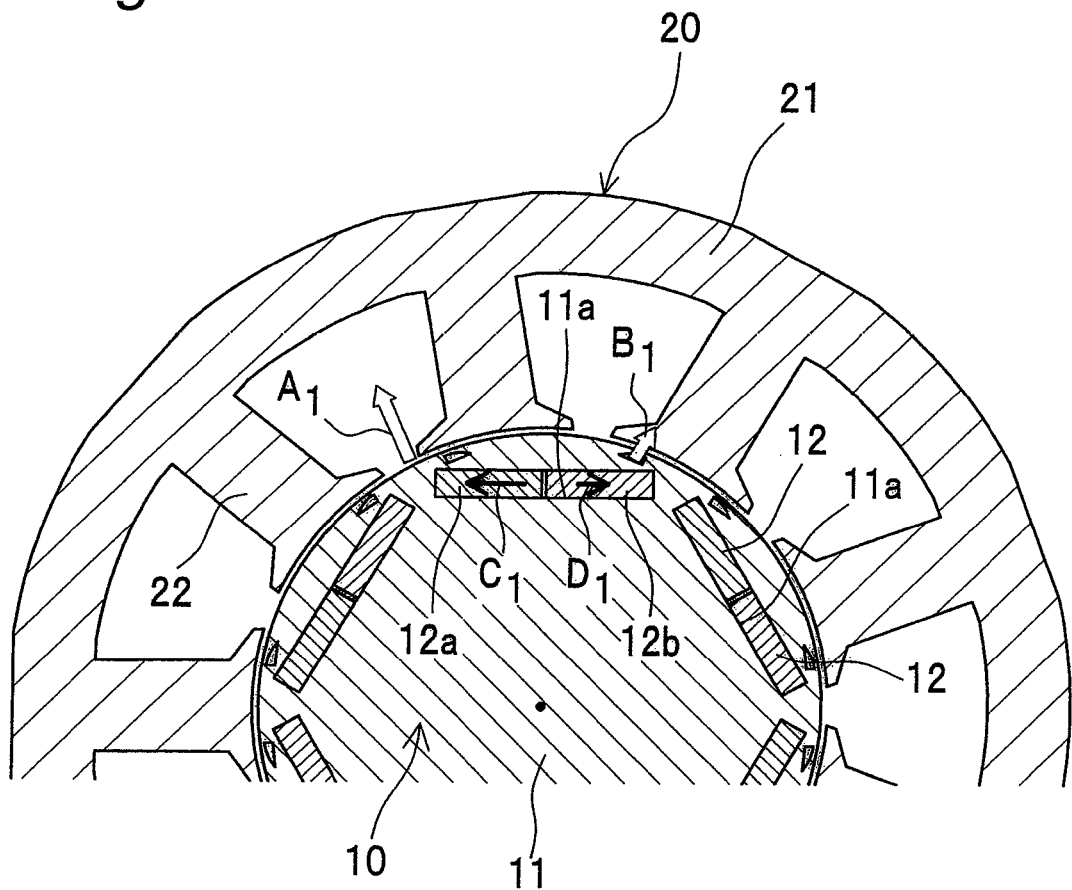
FIG. 2A is a sectional view of the motor showing action of an electromagnetic force of a stator on a rotor.

When one slot 11a is located in a specified position with respect to the stator 20 as shown in FIG. 2A, electromagnetic attraction forces by the stator 20 are exerted on the one slot 11a (the rotor 10), and an attraction force (arrow $A_1$) exerted on the left-hand side of the one slot 11a is larger than an attraction force (arrow $B_1$) exerted on the right-hand side of the one slot 11a. In FIG. 2A, the coils 23 are omitted in illustration.

Figure 2B:
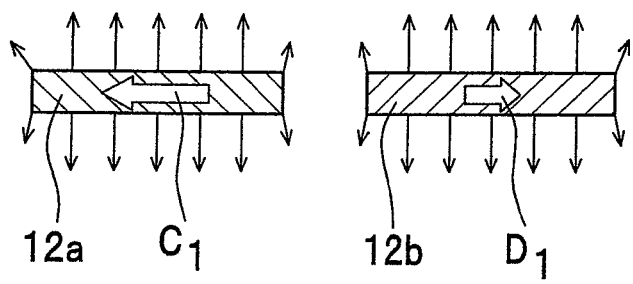
FIG. 2B is an explanatory view showing the action of the electromagnetic force of the stator on magnets.

In this case, as shown in FIGS. 2A and 2B, the magnet 12a located on the left-hand side in the one slot 11a is pulled leftward as indicated by arrow $C_1$ and brought in contact with the inner surface on the left-hand side of the one slot 11a. On the other hand, the magnet 12b located on the right-hand side in the one slot 11a is pulled rightward as indicated by arrow $D_1$ and brought in contact with the inner surface on the right-hand side of the one slot 11a. An attraction force in the direction of arrow $C_1$ is larger than an attraction force in the direction of arrow $D_1$.

In FIG. 2A, the gap between the left-hand and right-hand magnets 12a and 12b is illustrated larger than the actual one for better comprehension. In FIG. 2B, the attraction forces exerted on the left-hand and right-hand magnets 12a and 12b are indicated by thin arrows, and a synthesis of the attraction forces generates the attraction forces in the directions of arrows $C_1$ and $D_1$.

Figure 3A:
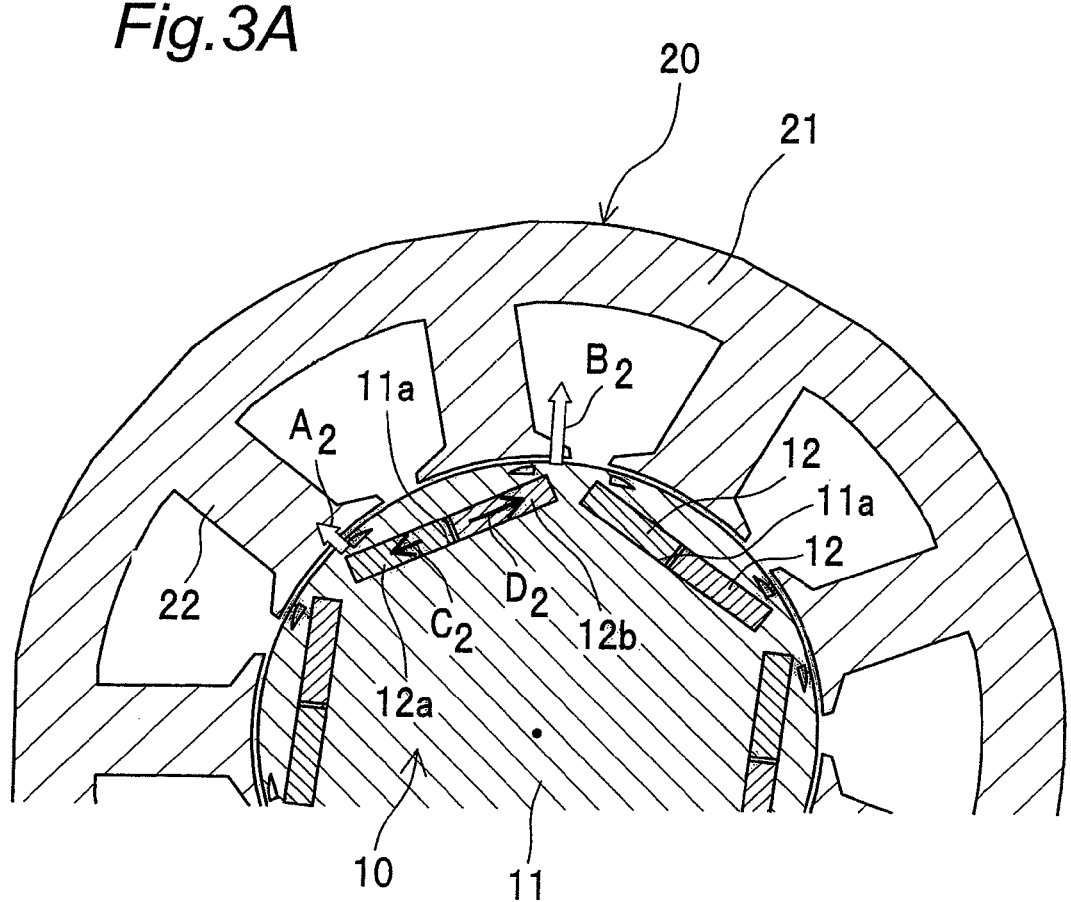
FIG. 3A is a sectional view of the motor showing the action of an electromagnetic force of the stator on the rotor.

When the rotor 10 is rotated by a prescribed central angle, as shown in FIG. 3A, the attraction force (arrow $A_2$) exerted on the left-hand side of the one slot 11a becomes smaller than the attraction force (arrow $B_2$) exerted on the right-hand side of the one slot 11a. In FIG. 3A, the coil 23 is omitted in illustration.

Figure 3B:
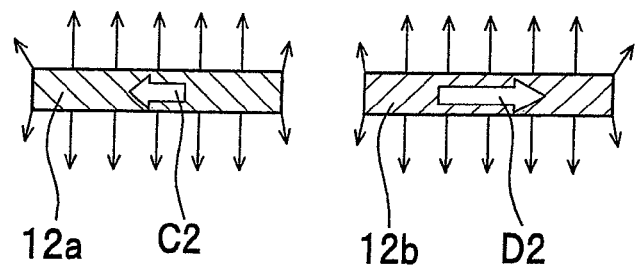
FIG. 3B is an explanatory view showing the action of the electromagnetic force of the stator on the magnets.

At the time, as shown in FIGS. 3A and 3B, the magnet 12a located on the left-hand side is pulled leftward as indicated by arrow $C_2$ and brought in contact with the inner surface on the left-hand side of the one slot 11a. On the other hand, the magnet 12b located on the right-hand side is pulled rightward as indicated by arrow $D_2$ and brought in contact with the inner surface on the right-hand side of the one slot 11a. The attraction force in the direction of arrow $C_2$ is smaller than the attraction force in the direction of arrow $D_2$.

In FIG. 3A, the gap between the left-hand and right-hand magnets 12a and 12b is illustrated larger than the actual one for better comprehension. In FIG. 3B, the attraction forces exerted on the left-hand and right-hand magnets 12a and 12b are indicated by thin arrows, and a synthesis of the attraction forces generate the attraction forces in the directions of arrows $C_2$ and $D_2$.

That is, the left-hand and right-hand magnets 12a and 12b are consistently pulled in the direction in which they are mutually separated by the magnetism of the stator 20 and fixed on the inner surfaces on both sides of the slot 11a in the circumferential direction of the rotor 10.

Figure 4:
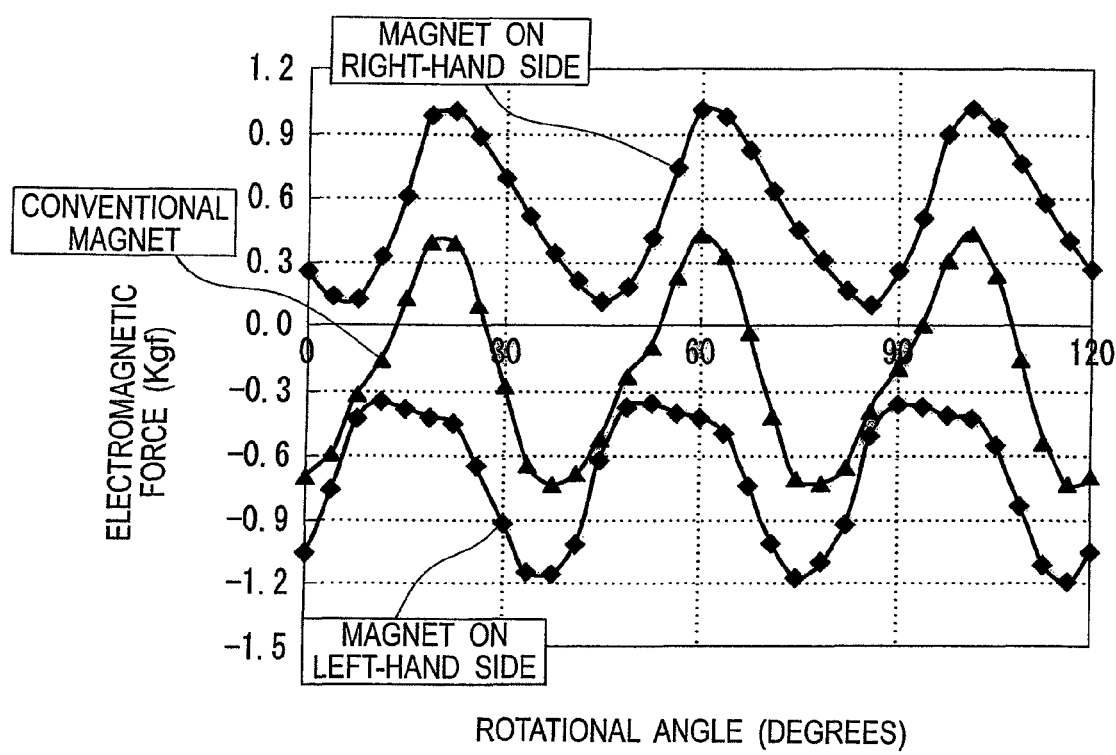
FIG. 4 is a graph showing a relation between rotational angles of the rotor and electromagnetic forces exerted on the magnets.

Next, FIG. 4 shows measurement results of the electromagnetic forces exerted on the left-hand and right-hand magnets 12a and 12b in the motor of the above construction. The horizontal axis represents the rotational angle of the rotor 10, and the vertical axis represents the electromagnetic force.

Figure 5A:
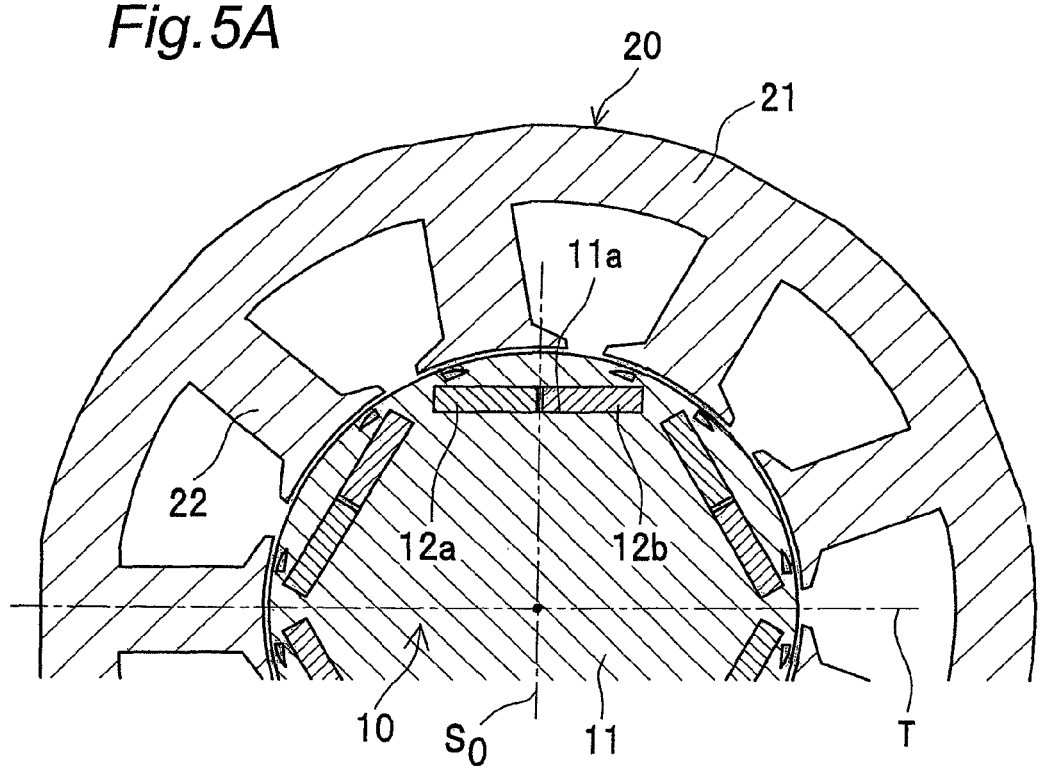
FIG. 5A is a sectional view of the motor when the rotational angle of the rotor is zero degree.

The rotational angle in the horizontal axis is described. As shown in FIG. 5A, a plane that is perpendicular to a plane T passing through the center of a specified teeth 22 and the rotational axis of the rotor 10 and passes through the rotational axis of the rotor 10 is assumed to be a reference plane $S_0$. When the center of the one slot 11a is made to coincide with the reference plane $S_0$, the rotational angle of the rotor 10 is assumed to be zero degree.

Figure 5B:
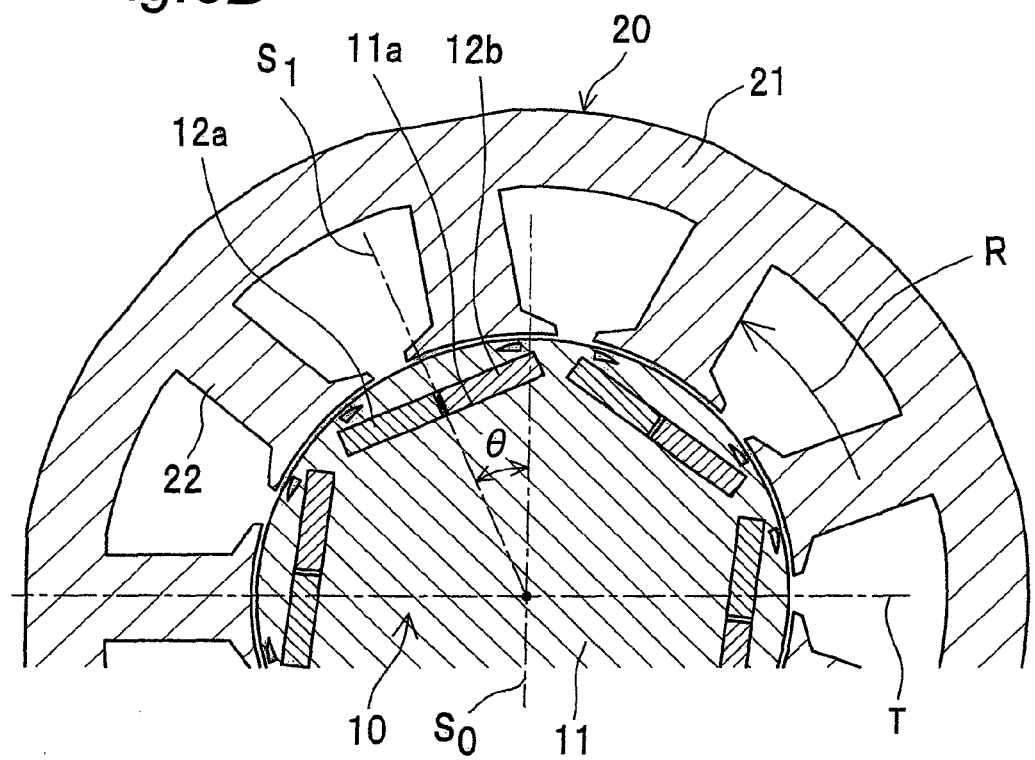
FIG. 5B is a sectional view of the motor when the rotational angle of the rotor is θ.

When the rotor 10 is rotated in the direction of arrow R as shown in FIG. 5B, an angle θ between a plane $S_1$ that passes through the center of the one slot 11a and the rotational axis of the rotor 10 and the reference plane $S_0$ is assumed to be the rotational angle in the horizontal axis of FIG. 4.

The electromagnetic force in the vertical axis of FIG. 4 is described. Negative values indicate electromagnetic forces exerted in the rotational direction of arrow R of the rotor 10 shown in FIG. 5B. It is assumed that a current peak value is 14 A, and a current phase is −70 degrees as measurement conditions.

As is apparent from FIG. 4, an electromagnetic force in the leftward direction (direction of arrow R) is consistently exerted on the magnet 12a located on the left-hand side shown in FIG. 5B. On the other hand, an electromagnetic force in the rightward direction (direction reverse to the direction of arrow R) is consistently exerted on the magnet 12b located on the right-hand side in FIG. 5B.

In FIG. 4, the case where one magnet is provided in the circumferential direction of the rotor in one slot of the prior art example is indicated as the "conventional magnet". That is, it can be understood that the one magnet is pulled alternately rightward and leftward depending on the rotational angle of the rotor.

According to the motor of the above construction, the two magnets 12 and 12 are provided in the circumferential direction of the rotor 10 in each of the slots 11a of the rotor 10. Therefore, the two magnets 12 and 12 are consistently pulled in the direction in which they are mutually separated by the magnetism of the stator 20 and fixed on the inner surfaces on both sides of the slot 11a in the circumferential direction of the rotor 10. That is, the magnetism of the stator 2 is exerted in the direction in which the two magnets 12 and 12 are mutually separated in each of the slots 11a.

Accordingly, since the magnets 12 do not reciprocatingly move in the circumferential direction of the rotor 10 in the slot 11a in the operation of the motor, sounds and vibrations generated by the collision of the magnets 12 with the inner surfaces of the slot 11a can be prevented.

Moreover, since the positions of the magnets 12 are definite without variations in the operation of the motor, the magnetism of the magnets 12 is not changed by the pole, preventing the unbalance of the magnetic flux flow. Moreover, since the magnets 12 are not displaced, electromagnetic excitation forces exerted on the teeth 22 can be reduced.

That is, the motor of the present invention has a construction in which one magnet in one slot shown in the prior art example is divided into two pieces by cutting in the lengthwise (rotor rotational axis) direction.

Moreover, since the slot 11a is formed in the rectangular shape and the magnets 12 have the flat plate-like shape, the slots 11a and the magnets 12 can be simply formed.

Moreover, since the two magnets 12 and 12 in the identical slot 11a have the generally identical shape or the generally identical structure, the two magnets of a good magnetic balance can be simply formed. Moreover, since the two magnets 12 and 12 in the identical slot 11a have the identical polarity, the magnetism exerted on the two magnets 12 and 12 in each of the slots 11a is not reduced, and the torque of the rotor 10 is not reduced.

A method for assembling the rotor 10 is described next.

Figure 6A:
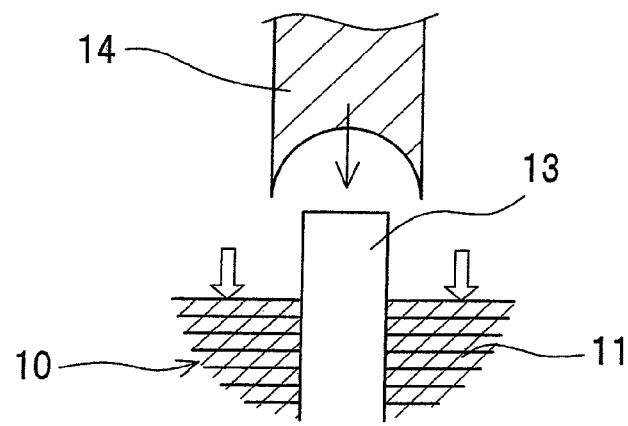
FIG. 6A is a process chart showing a first step of a rotor assembling method.

When the rotor main body 11 of the rotor 10 is a laminated steel sheet, a flat-ended solid rivet 13 is inserted in a through hole of the rotor main body 11 as shown in FIG. 6A, and a calking tool 14 is brought close to the one end of the rivet 13 while pressurizing the rotor main body 11. The one end of the rivet 13 is solid.

Figure 6B:
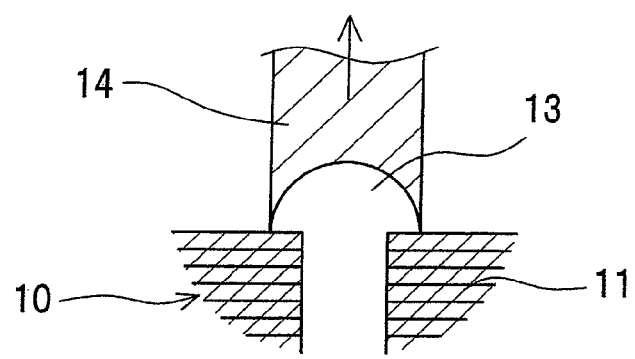
FIG. 6B is a process chart showing a second step of a rotor assembling method.
Figure 6C:
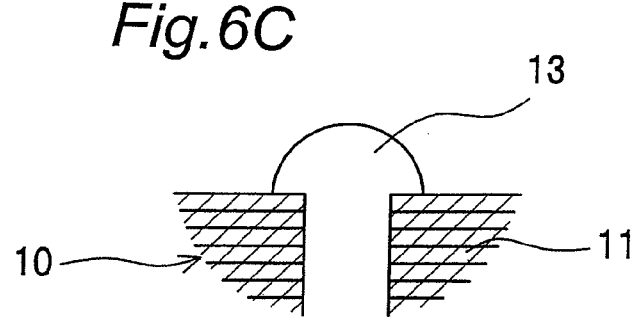
FIG. 6C is a process chart showing a third step of a rotor assembling method.

Then, the one end of the rivet 13 is deformed into a hemispherical shape by the calking tool 14 as shown in FIG. 6B, so that the rotor main body 11 is fixed with the rivet 13 of the solid round type as shown in FIG. 6C. That is, the one end of the rivet 13 is deformed into a solid hemispherical flange-like shape. The other end of the rivet 13 has preliminarily been formed in a solid flange-like shape.

Therefore, since the rotor main body 11 is fixed with the rivet 13 of the solid round type, the rigidity of the rivet 13 is increased, and the rotor main body 11 can be firmly fixed. Moreover, since the rotor main body 11 is preliminarily compressed, the spring repulsion of the laminated steel sheet is therefore reliably suppressed, allowing the fixation with the rivet 13 and shortening of the length in the rotational axis direction of the rotor main body 11 to be achieved. The one end of the rivet 13 may be a flat type instead of being the round type and only required to have a solid flange-like shape.

Second Embodiment

Figure 7:
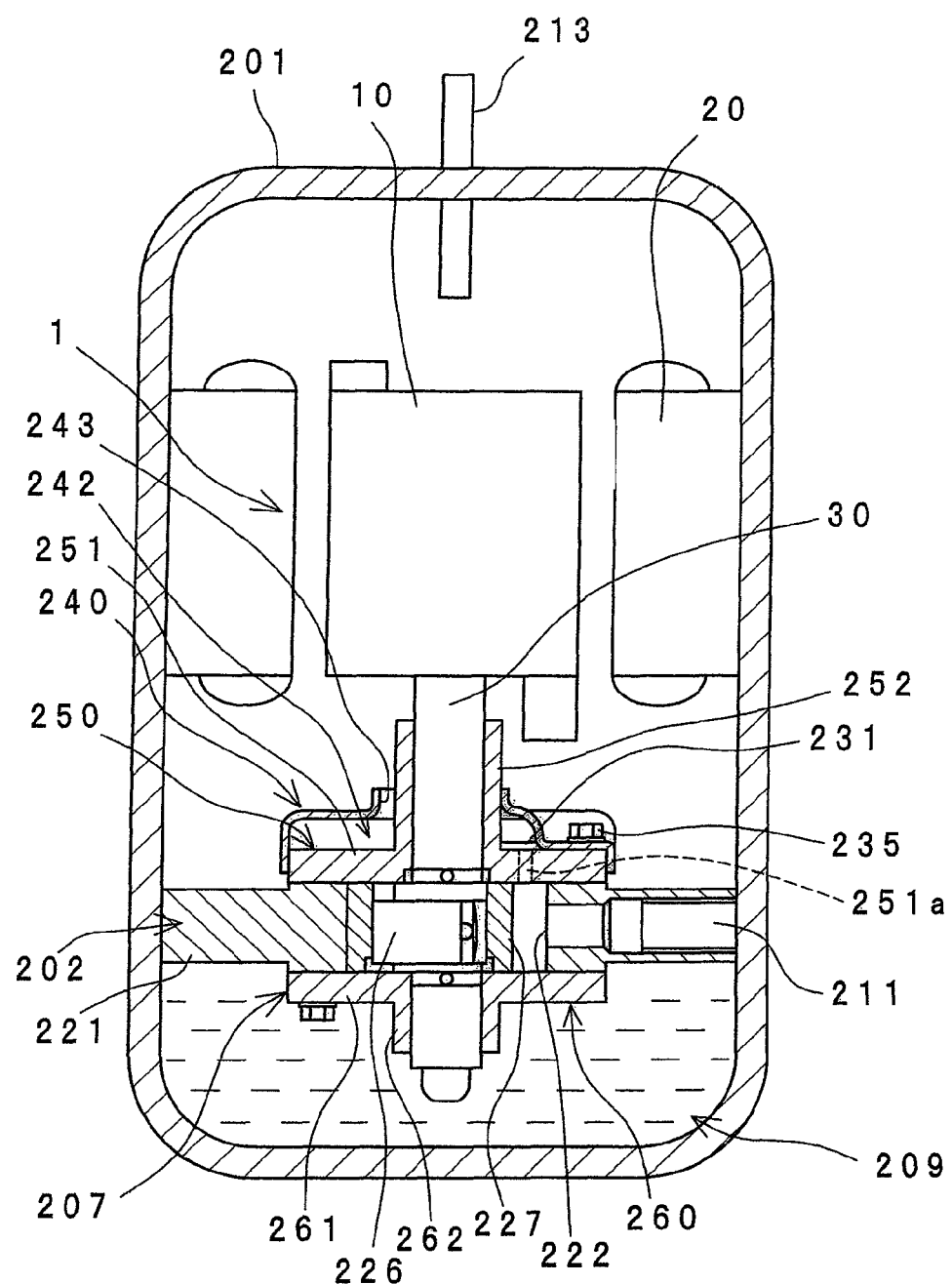
FIG. 7 is a longitudinal sectional view showing one embodiment of a compressor of the present invention.

FIG. 7 shows a longitudinal sectional view of one embodiment of the compressor of the present invention. The compressor has a closed vessel 201, a compression element 202 placed in the closed vessel 201, and the motor 1 of the first embodiment that is placed in the closed vessel 201 and drives the compression element 202 via the shaft 30.

The compressor is the so-called high-pressure dome type rotary compressor, where the compression element 202 is placed in a lower portion and the motor 1 is placed in an upper portion in the closed vessel 201. The compression element 202 is driven by the rotor 10 of the motor 1 via the shaft 30.

The compression element 202 sucks a refrigerant gas from an accumulator (not shown) through a suction pipe 211. The refrigerant gas is obtained by controlling a condenser, an expansion mechanism and an evaporator (not shown) that constitute an air conditioner as one example of a refrigeration system together with the compressor.

The compressor fills the inside of the closed vessel 201 with a compressed high-temperature high-pressure discharge gas discharged from the compression element 202 and discharges the gas to the outside from a delivery pipe 213 after cooling the motor 1 through the gap between the stator 20 and the rotor 10 of the motor 1. A lubricating oil 209 is accumulated in a lower portion of a high-pressure region in the closed vessel 201.

The compression element 202 has a cylinder main body 221 and an upper end plate member 250 and a lower end plate member 260, which are attached to upper and lower opening ends, respectively, of the cylinder main body 221. The cylinder main body 221, the upper end plate member 250 and the lower end plate member 260 constitute a cylinder chamber 222.

The upper end plate member 250 has a disk-shaped main body portion 251 and a boss portion 252 provided extending upward at the center of the main body portion 251. The main body portion 251 and the boss portion 252 receive the shaft 30 inserted therethrough. A delivery port 251a that communicates with the cylinder chamber 222 is provided at the main body portion 251.

A delivery valve 231 is attached to the main body portion 251 so as to be positioned oppositely from the cylinder main body 221 with respect to the main body portion 251. The delivery valve 231 is, for example, a reed valve to open and close the delivery port 251a.

A cup-shaped muffler main body 240 is attached to the main body portion 251 so as to cover the delivery valve 231. The muffler main body 240 is fixed to the main body portion 251 with a fixing member 235 (bolt or the like). The muffler main body 240 receives the boss portion 252 inserted therethrough.

A muffler chamber 242 is formed of the muffler main body 240 and the upper end plate member 250. The muffler chamber 242 and the cylinder chamber 222 communicate with each other via the delivery port 251a.

The muffler main body 240 has a hole portion 243. The hole portion 243 makes the muffler chamber 242 and the outside of the muffler main body 240 communicate with each other.

The lower end plate member 260 has a disk-shaped main body portion 261 and a boss portion 262 provided extending downward at the center of the main body portion 261. The main body portion 261 and the boss portion 262 receive the shaft 30 inserted therethrough.

In short, the one end portion of the shaft 30 is supported by the upper end plate member 250 and the lower end plate member 260. That is, the shaft 30 is cantilevered. The one end portion (supported end side) of the shaft 30 enters inside the cylinder chamber 222.

An eccentric pin 226 is provided on the supported end side of the shaft 30 so as to be positioned inside the cylinder chamber 222 on the compression element 202 side. The eccentric pin 226 is fitted in a roller 227. The roller 227 is revolvably placed in the cylinder chamber 222, and compressing operation is performed by the revolving motions of the roller 227.

In other words, the one end portion of the shaft 30 is supported on both sides of the eccentric pin 226 by a housing 207 of the compression element 202. The housing 207 includes the upper end plate member 250 and the lower end plate member 260.

The compressing operation of the cylinder chamber 222 is herein described.

Figure 8:
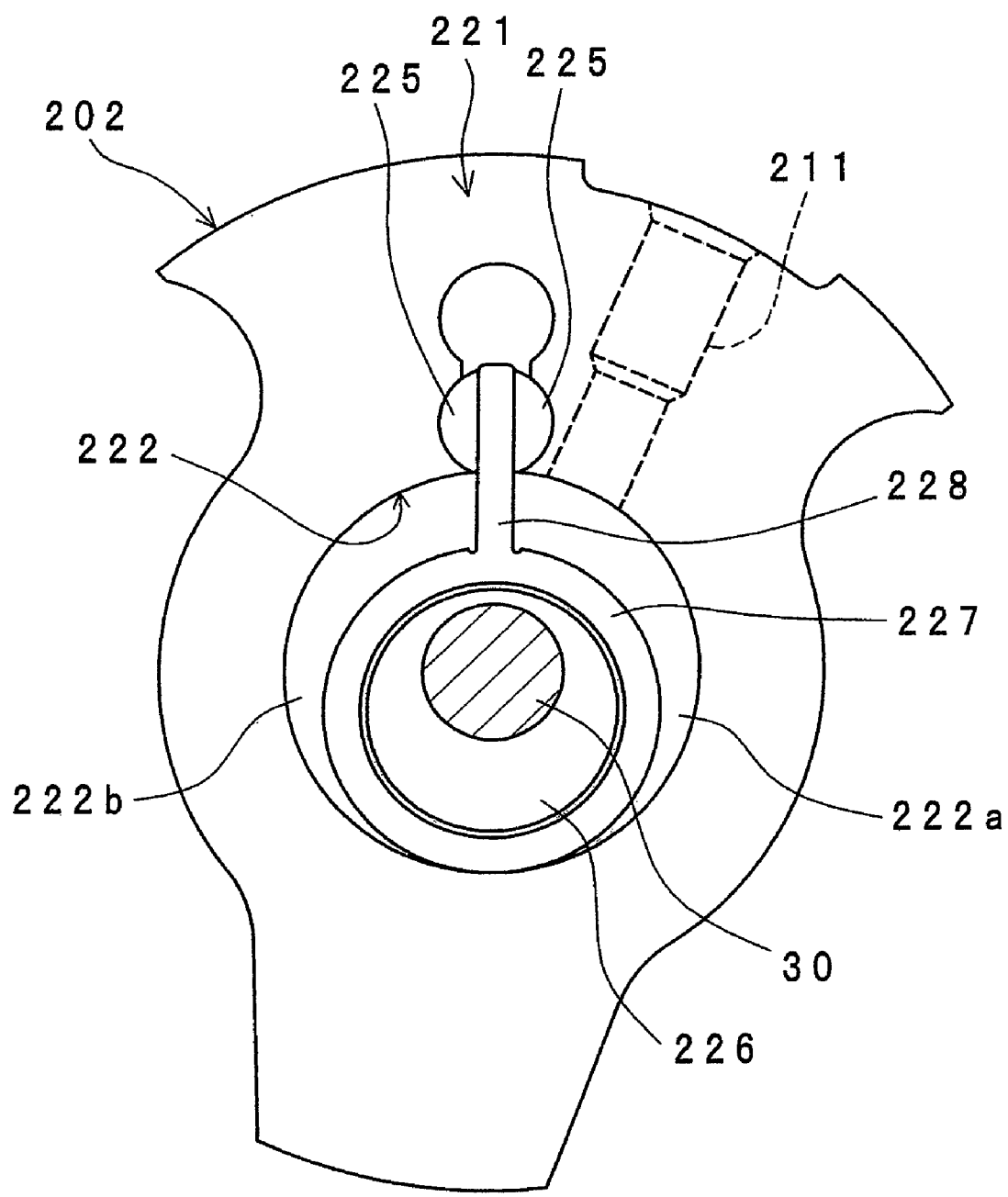
FIG. 8 is a plan view of essential part of the compressor.
Figure 9A:
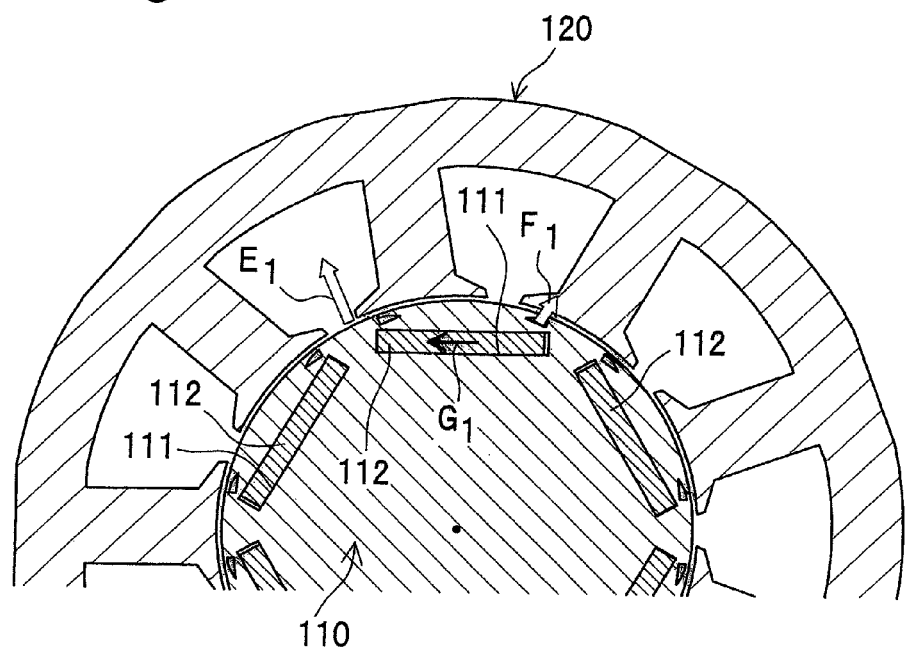
FIG. 9A is a sectional view of a conventional motor showing action of an electromagnetic force of a stator on a rotor.
Figure 9B:
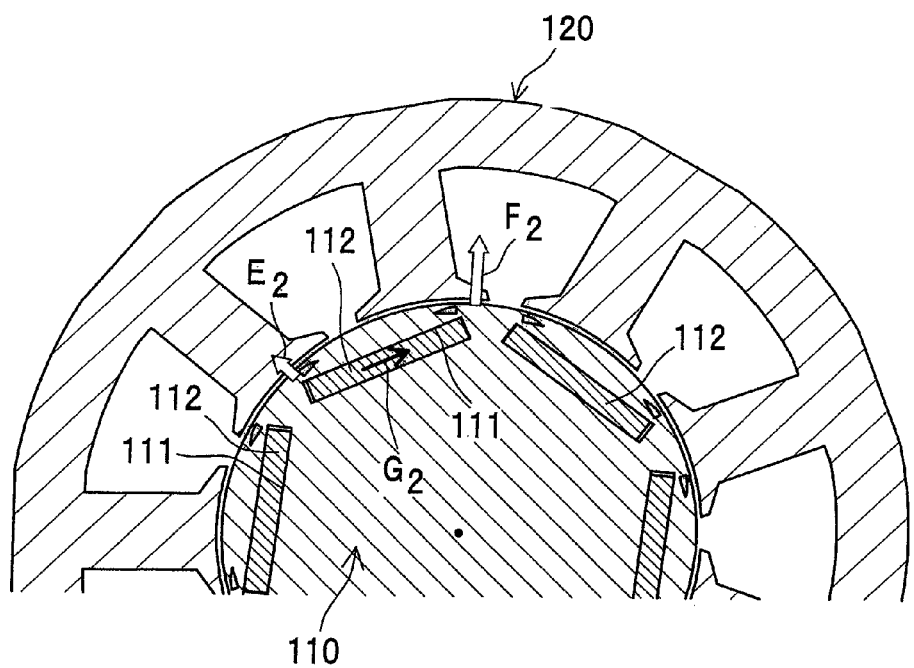
FIG. 9B is a sectional view of the conventional motor showing the action of the electromagnetic force of the stator on the rotor.

As shown in FIG. 8, the cylinder chamber 222 is internally partitioned by a blade 228 provided integrally with the roller 227. That is, in a chamber located on the right-hand side of the blade 228, the suction pipe 211 is opened at the inner surface of the cylinder chamber 222 and forms a suction chamber (low-pressure chamber) 222a. On the other hand, in a chamber located on the left-hand side of the blade 228, the delivery port 251a (shown in FIG. 7) is opened at the inner surface of the cylinder chamber 222 and forms a delivery chamber (high-pressure chamber) 222b.

Semicircular bushing 225, 225 are brought in tight contact with both surfaces of the blade 228 and effect sealing. Lubrication is achieved by the lubricating oil 209 between the blade 228 and the bushing 225, 225.

The eccentric pin 226 eccentrically rotates with the shaft 30, and the roller 227 fitted on the eccentric pin 226 revolves with the outer peripheral surface of the roller 227 brought in contact with the inner peripheral surface of the cylinder chamber 222.

In accordance with the revolution of the roller 227 in the cylinder chamber 222, the blade 228 advances and retreats with both side surfaces of the blade 228 being held by the bushing 225, 225. Then, a low-pressure refrigerant gas is sucked from the suction pipe 211 into the suction chamber 222a and compressed to a high pressure in the delivery chamber 222b, and thereafter, a high-pressure refrigerant gas is discharged from the delivery port 251a (shown in FIG. 7).

Subsequently, as shown in FIG. 7, the refrigerant gas discharged from the delivery port 251a is discharged via the muffler chamber 242 to the outside of the muffler main body 240.

According to the compressor of the above construction having the motor 1 of the first embodiment, even if the lubricating oil 209 in the compressor enters the slots 11a shown in FIG. 1 and the magnets 12 are easily movable in the operation of the compressor, the magnets 12 do not reciprocatingly move in the slots. Therefore, sounds and vibrations generated by the collision of the magnets 12 with the inner surfaces of the slots 11a can be prevented.

It is noted that the present invention is limited to neither of the above embodiments. For example, the amount of the slots 11a and the teeth 22 can freely be increased or decreased. A plurality of the magnets 12 may be provided in the rotational axis direction of the rotor 10 in the slot 11a. The shapes of the slots 11a and the magnets 12 may be formed into a bow-like shape along the outer peripheral surface of the rotor 10 when viewed from the rotational axis direction of the rotor 10. A rotary type in which the roller and the blade are separate bodies is acceptable as the compression element 202. A scroll type or a reciprocating type may be employed besides the rotary type as the compression element 202.

What is claimed is:

1. A compressor comprising:
   a closed vessel;
   a compression element placed in the closed vessel, the compression element including
      a cylinder chamber,
      a roller disposed in the cylinder chamber and configured to revolve with an outer peripheral surface of the roller brought in contact with an inner peripheral surface of the cylinder chamber, and
      a blade cooperating with the roller for partitioning an inside of the cylinder chamber; and
   a motor placed in the closed vessel to drive the compression element via a shaft, the motor including
      a rotor including a plurality of circumferentially arranged slots, and
      a stator disposed radially outwardly of the rotor, the stator having
         an annular stator main body, and
         nine teeth that project radially inwardly from an inner peripheral surface of the stator main body, with coils are wound around each of the nine teeth in concentrated manner,
   each of the slots being formed into a rectangular shape extending in a direction perpendicular to a radial direction of the rotor when viewed from a rotational axis direction of the rotor, each rectangular slot having radially inner and outer parallel sides and circumferentially spaced parallel ends that are perpendicular to the radially inner and outer parallel sides,
   a size of each slot being set so that the two magnets received therein can mutually approach or separate in the slot,
   the magnets having a flat plate-like shape when viewed from the rotational axis direction of the rotor, and
   the two magnets received in each slot have radially outward portions that have an identical polarity of one of a south pole and a north pole, and radially inward portions that have an identical polarity of the other one of the south pole and the north pole such that there is a gap between the two magnets in the slot.

2. The compressor as claimed in claim 1, wherein a magnetism of the stator is exerted in a direction such that the two magnets in each slot are separated from each other.

3. The compressor as claimed in claim 1, wherein the two magnets in each slot have generally identical shapes.

4. The compressor as claimed in claim 1, wherein the two magnets in each slot have generally identical structures.

* * * * *